US006608590B1

(12) United States Patent
Naym et al.

(10) Patent No.: US 6,608,590 B1
(45) Date of Patent: Aug. 19, 2003

(54) ALIGNMENT OF ANTENNA POLARIZATION AXES

(75) Inventors: Guy Naym, Netanya (IL); Hanan Keren, Kfar Sava (IL)

(73) Assignee: Orbit Communication Ltd., Netanya (IL)

( * ) Notice: Subject to any disclaimer, the term of this patent is extended or adjusted under 35 U.S.C. 154(b) by 0 days.

(21) Appl. No.: 10/086,421

(22) Filed: Mar. 4, 2002

(51) Int. Cl.[7] ............................ H01Q 3/00; H04B 7/19; H04B 17/00; H04B 7/10

(52) U.S. Cl. ........................ 342/359; 342/356; 342/361; 342/362; 455/67.14; 455/67.15; 455/70; 455/71

(58) Field of Search ................................ 342/356, 359, 342/361, 362; 455/67.14, 67.15, 70, 71, 295

(56) References Cited

U.S. PATENT DOCUMENTS 4,292,685 A * 9/1981 Lee ............................ 342/361
4,438,530 A * 3/1984 Steinberger ................. 342/361
4,512,024 A * 4/1985 Gutleber ..................... 342/361
4,785,302 A 11/1988 Ma et al.
4,888,592 A * 12/1989 Paik et al. .................. 342/359
4,965,809 A * 10/1990 Endo .......................... 342/361
5,657,031 A 8/1997 Anderson et al.
6,337,658 B1 1/2002 Tong et al.

OTHER PUBLICATIONS

Lin–shan Lee, New automatic polarization cancelling control for multiple–station satellite communication systems, IEEE International Conference on Communications, p. 43.3.1–43.3.5, 1978.*

* cited by examiner

*Primary Examiner*—Thomas H. Tarcza
*Assistant Examiner*—F H Mull
(74) *Attorney, Agent, or Firm*—Mark M. Friedman

(57) ABSTRACT

A method for aligning an antenna polarization axes of a dual polarized end-user terminal having an antenna. The antenna is aligned with a satellite in relation to azimuth and elevation. The end-user terminal is configured in an alignment mode to produce a first output corresponding to a first component of a received signal parallel to a first polarization axis of the antenna and a second output corresponding to a second component of the received signal parallel to a second polarization axis of the antenna. The first polarization axis is orthogonal to the second polarization axis. The method includes the steps of: receiving a linearly polarized signal; autocorrelating the first output and the second output to produce a measurement of autocorrelation; and adjusting the antenna polarization axes to minimize the measurement of autocorrelation.

22 Claims, 6 Drawing Sheets

Fig. 5

| Polarization offset angle | Autocorrelation method: signal to noise ratio due to offset angle | Signal-Strength method: change in signal strength |
|---|---|---|
| 0 degrees | 0bB | 0dB |
| 1 degree | 17dB | 0.0013dB |
| 2 degrees | 23dB | 0.0053dB |
| 3 degrees | 26dB | 0.0119dB |
| 4 degrees | 29dB | 0.0211dB |
| 5 degrees | 31dB | 0.0311dB |

ALIGNMENT OF ANTENNA POLARIZATION AXES

FIELD AND BACKGROUND OF THE INVENTION

The present invention relates to alignment of antenna polarization axes and, in particular, it concerns alignment of antenna polarization axes of a dual polarized end-user terminal.

Geostationary satellite transponders are in common orbit 23,000 miles above the earth. The satellites share common latitude on the equator and are spaced apart longitudinally in an orbital arc, called the Clark belt, sometimes by less than one degree. When communicating with these satellites care must be taken not to illuminate more than one satellite with up-link radio frequency energy and, conversely, not to receive interfering signals from adjacent satellites located along the Clark belt. A satellite communicates using various frequencies to maximize the communication capacity of the satellite. Moreover, a satellite also typically communicates in two polarization axes, being orthogonal to each other, to maximize the capacity of each available frequency. Regulatory authorities, such as the FCC and ETSI require that the end-user terminal be aligned very accurately with the satellite. The regulations require that other satellites and also a non-designated polarization axis of the designated satellite will not receive even a component of the transmitted signal from the end-user terminal that exceeds a very low threshold. Therefore it is essential for the azimuth, elevation and polarization alignment of the end-user terminal to be aligned accurately. As is known in the art, azimuth and elevation alignment can be performed by adjusting the antenna direction of the end-user terminal to maximize the received signal from the designated satellite. This is known as the signal strength pointing method. Similar adjustment for polarization alignment does not yield satisfactory results and another method must be employed. The current method for polarization adjustment includes the installer sending a linearly polarized test signal from the end-user terminal to the satellite. The test signal is received by the satellite. A component of the test signal is received in one polarization axis of the satellite and another component of the test signal is received in the other polarization axis of the satellite. The magnitude of the components in each axis is received by the satellite control center. The installer telephones the control center for the results and then adjusts the antenna polarization. Another test signal is sent to the satellite and the process continues until the antenna polarization is aligned with the satellite. This process is very difficult, time consuming and not accurate. Moreover, the designated frequency in both polarization axes of the satellite cannot be used for normal communications during this alignment process. There is therefore a need for a system and method of aligning antenna polarization axes of a dual polarized end-user terminal.

SUMMARY OF THE INVENTION

The present invention is a system and method of aligning antenna polarization axes of a dual polarized end-user terminal.

According to the teachings of the present invention there is provided, a method for aligning antenna polarization axes of a dual polarized end-user terminal having an antenna, the antenna being aligned with a satellite in relation to azimuth and elevation, the end-user terminal being configured to produce a first output corresponding to a first component of a received signal parallel to a first polarization axis of the antenna and a second output corresponding to a second component of the received signal parallel to a second polarization axis of the antenna, the first polarization axis being orthogonal to the second polarization axis, the method comprising the steps of: (a) receiving a linearly polarized signal having a frequency wherein for the frequency and during a time period when the signal is being transmitted, the satellite is not transmitting signals with a linear polarization that is orthogonal to the linearly polarized signal; (b) autocorrelating the first output and the second output to produce a measurement of autocorrelation; and (c) adjusting the antenna polarization axes to minimize the measurement of autocorrelation.

According to a further feature of the present invention, the step of autocorrelating is performed by inputting the first output and the second output into an electronic mixer to produce the measurement of autocorrelation.

According to a further feature of the present invention, there is also provided the step of reducing proportionately frequencies of the first output and the second output.

According to a further feature of the present invention, there is also provided the step of tuning the first output and the second output to the frequency.

According to a further feature of the present invention, there is also provided the step of filtering the first output using a first band pass filter and the second output using a second band pass filter.

According to a further feature of the present invention, the step of autocorrelating is performed by inputting the first output and the second output into an electronic mixer and inputting the output of the electronic mixer into a low-pass filter to produce the measurement of autocorrelation.

According to a further feature of the present invention, there is also provided after the step of autocorrelating, the step of displaying the measurement of autocorrelation.

According to a further feature of the present invention, the step of adjusting is performed by actuating an alignment actuator configured to adjust the antenna polarization axes to minimize the measurement of autocorrelation.

According to the teachings of the present invention there is also provided, a system for aligning antenna polarization axes of a dual polarized end-user terminal having an antenna, the antenna being aligned with a satellite in relation to azimuth and elevation, the end-user terminal being configured to produce a first output corresponding to a first component of a received signal parallel to a first polarization axis of the antenna and a second output corresponding to a second component of the received signal parallel to a second polarization axis of the antenna, the first polarization axis being orthogonal to the second polarization axis, the system comprising: (a) a first connection configured for connection to the end-user terminal for receiving the first output; (b) a second connection configured for connection to the end-user terminal for receiving the second output; and (c) an autocorrelation apparatus having a first input and a second input; wherein the first connection is connected to the first input and the second connection is connected to the second input.

According to a further feature of the present invention, the autocorrelation apparatus includes an electronic mixer having a first input that is connected to the first connection and a second input that is connected to the second connection.

According to a further feature of the present invention: (a) the autocorrelation apparatus further includes a low-pass filter having an input; and (b) the electronic mixer has an output that is connected to the input of the low-pass filter.

According to a further feature of the present invention: (a) the low-pass filter has an output; and (b) the input of the display is connected to the output of the low-pass filter.

According to a further feature of the present invention: (a) the autocorrelation apparatus further includes a dual polarized block down-converter having a first input that is connected to the first connection and a second input that is connected to the second connection; and (b) the dual polarized block down-converter is interposed between the first connection, the second connection and the electronic mixer.

According to a further feature of the present invention, there is also provided: (a) a first down-converter that is interposed between the first connection and the electronic mixer; and (b) a second down-converter that is interposed between the second connection and the electronic mixer.

According to a further feature of the present invention, the autocorrelation apparatus includes: (a) a first tuner that is interposed between the first connection and the electronic mixer; and (b) a second tuner that is interposed between the second connection and the electronic mixer.

According to a further feature of the present invention, the autocorrelation apparatus includes: (a) a first band pass that is interposed between the first connection and the electronic mixer; and (b) a second band pass filter that is interposed between the second connection and the electronic mixer.

According to a further feature of the present invention, there is also provided an alignment control system and an alignment actuator wherein the alignment control system is configured to control the alignment actuator to adjust the antenna polarization axes in response to an output of the autocorrelation apparatus.

According to the teachings of the present invention there is also provided, a system for aligning antenna polarization axes comprising: (a) a dual polarized end-user terminal having an antenna and the antenna having an associated first polarization axis and a second polarization axis, wherein: (i) the first polarization axis is orthogonal to the second polarization axis; and (ii) the end-user terminal is configured to produce a first output corresponding to a first component of a received signal parallel to the first polarization axis and a second output corresponding to a second component of the received signal parallel to a second polarization axis; (b) a first connection configured for connection to the end-user terminal for receiving the first output; (c) a second connection configured for connection to the end-user terminal for receiving the second output; and (d) an autocorrelation apparatus having a first input and a second input; wherein the first connection is connected to the first input and the second connection is connected to the second input.

According to a further feature of the present invention, the autocorrelation apparatus includes an electronic mixer having a first input that is connected to the first connection and a second input that is connected to the second connection.

According to a further feature of the present invention: (a) the autocorrelation apparatus further includes a low-pass filter having an input; and (b) the electronic mixer has an output that is connected to the input of the low-pass filter.

According to a further feature of the present invention, there is also provided a display having an input and wherein: (a) the low-pass filter has an output; and (b) the input of the display is connected to the output of the low-pass filter.

According to a further feature of the present invention, there is also provided an alignment control system and an alignment actuator wherein the alignment control system is configured to control the alignment actuator to adjust the antenna polarization axes in response to an output of the autocorrelation apparatus.

BRIEF DESCRIPTION OF THE DRAWINGS

The invention is herein described, by way of example only, with reference to the accompanying drawings, wherein:

FIG. 5 is a table comparing the system of FIG. 4 to a signal strength system of polarization alignment;

DESCRIPTION OF THE PREFERRED EMBODIMENTS

The present invention is a system and method of aligning antenna polarization axes of a dual polarized end-user terminal.

The principles and operation of a system and method of aligning antenna polarization axes of a dual polarized end-user terminal according to the present invention may be better understood with reference to the drawings and the accompanying description.

Figure 1:
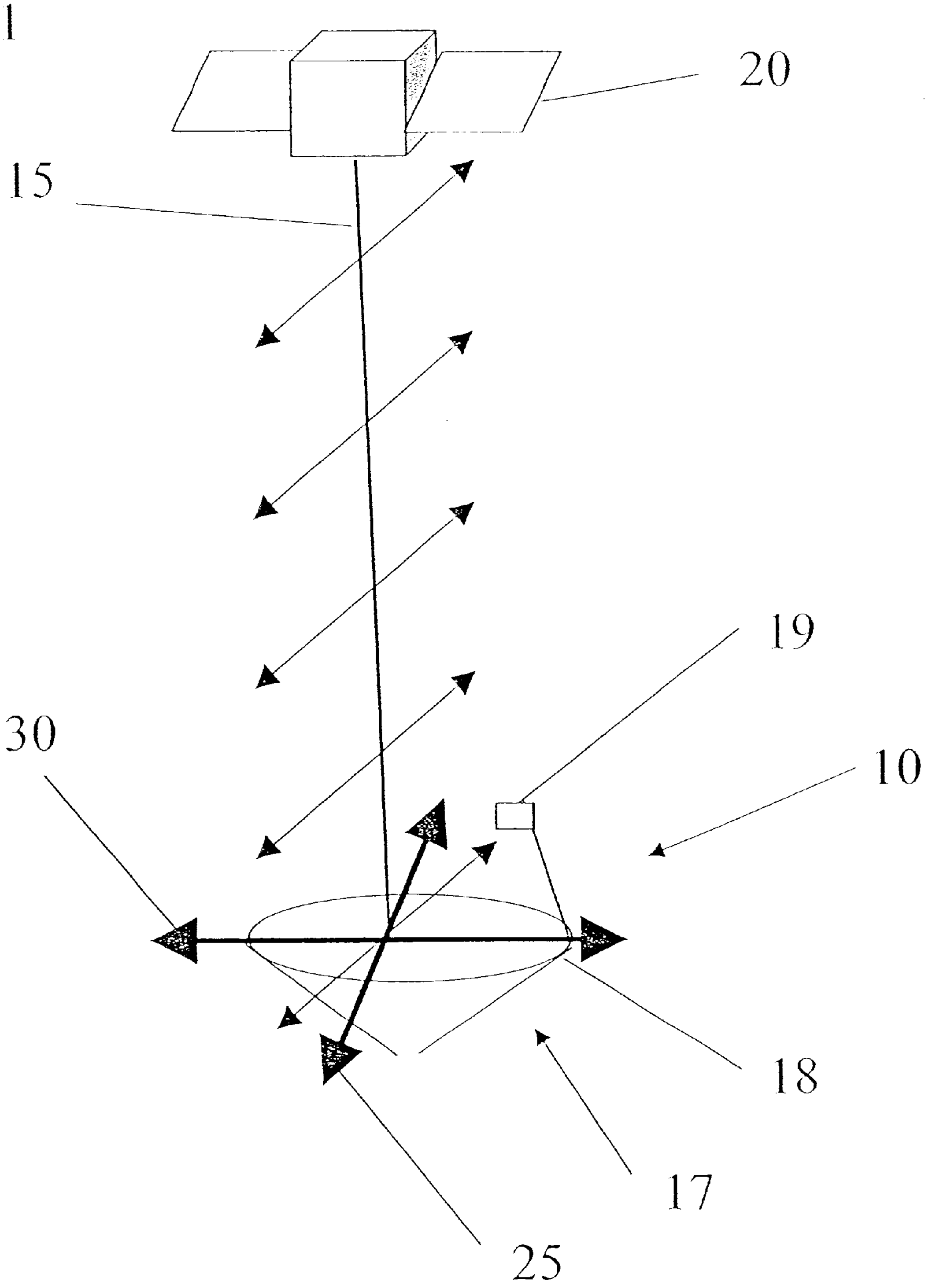
FIG. 1 is a schematic orthogonal view of a linearly polarized signal being received from a satellite by an end-user terminal in alignment mode that is constructed and operable in accordance with a preferred embodiment of the invention.
Figure 2:
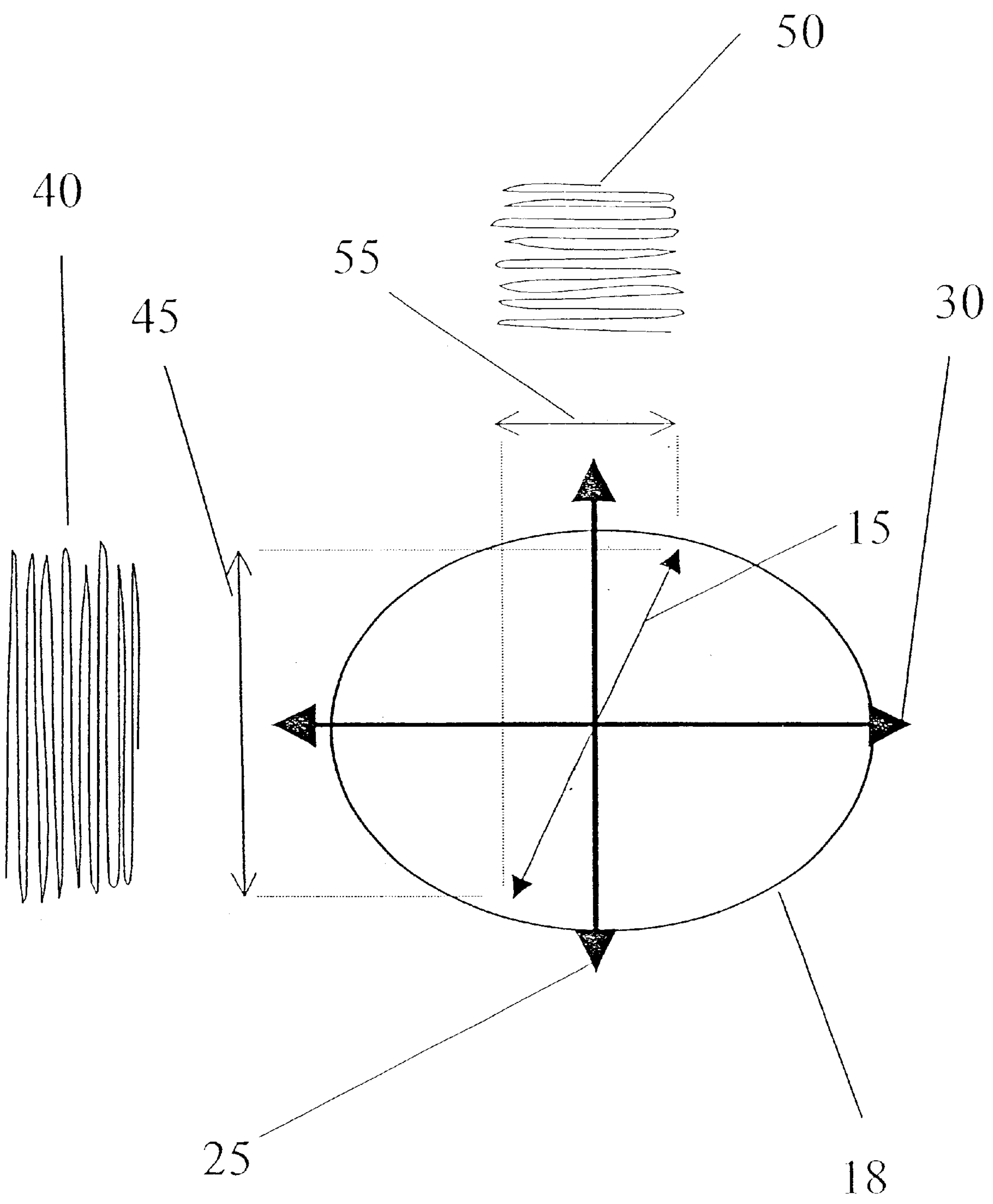
FIG. 2 is a schematic plan view of the linearly polarized signal being received by the end-user terminal of FIG. 1.

Reference is now made to FIGS. 1 and 2. FIG. 1 is a schematic orthogonal view of an end-user terminal 10 receiving a linearly polarized signal 15 from a satellite 20 in alignment mode that is constructed and operable in accordance with a preferred embodiment of the invention. FIG. 2 is a schematic plan view of the end user terminal 10 receiving linearly polarized signal 15. End-user terminal has an antenna 17. Antenna 17 includes a reflector 18 and an antenna feed 19. End-user terminal 10 is dual polarized meaning that antenna 17 has an associated polarization axis, known in the art as co-polarization axis 25 and an associated polarization axis, known in the art as cross polarization axis 30. Co-polarization axis 25 is orthogonal to cross polarization axis 30. End-user terminal 10 is configured to produce an output corresponding to a component of a received signal parallel to co-polarization axis 25. End-user terminal 10 is also configured to produce another output corresponding to a component of a received signal parallel to cross-polarization axis 30.

Before polarization alignment commences antenna 17 is aligned with satellite 20 in relation to azimuth and elevation. Polarization axes 25, 30 are aligned as close as possible with the polarization axes of satellite 20. Typically, this initial polarization is within 5 degrees of the optimal polarization. The alignment process now commences. Antenna 17 receives linearly polarized signal 15. Signal 15 is transmitted at a known frequency. In fact, signal 15 is typically a modulated signal having a range of frequencies. Therefore, the term frequency refers to a range of frequencies or frequency band. During the time period of the alignment process it is important that for the frequency of signal 15, satellite 20 is not transmitting signals with a linear polarization that is orthogonal to the linear polarization of signal 15. End-user terminal 10 produces an output 40 corresponding to a component 45 of signal 15 received parallel to co-polarization axis 25 and an output 50 corresponding to a component 55 of signal 15 received parallel to cross polarization axis 30. Output 40 and output 50 are autocorrelated and produce a measurement of autocorrelation. Output 40 and output 50 may contain signals and other than signal 15. Therefore, by autocorrelating output 40 and output 50, only parts of output 40 and output 50 that contain signal 15 will be multiplied together to produce the measurement of autocorrelation. Therefore, the measurement of autocorrelation gives a measurement of the alignment of polarization axes 25, 30 to the polarization axis of signal 15. Therefore, the measurement of autocorrelation gives a measurement of the alignment of polarization axes 25, 30 to the polarization axes of satellite 20. As the polarization axis of signal 15 becomes more parallel to co-polarization axis 25, component 45 increases and component 55 decreases and therefore the measurement of autocorrelation decreases. When the polarization axis of signal 15 is parallel to co-polarization axis 25, the measurement of autocorrelation will be zero. Polarization axes 25, 30 of antenna 17 are adjusted to minimize the measurement of autocorrelation. The above method of alignment enables accurate and quick alignment of antenna polarization without the need to send a signal to the satellite and to telephone the control center to receive adjustment data.

Figure 3:
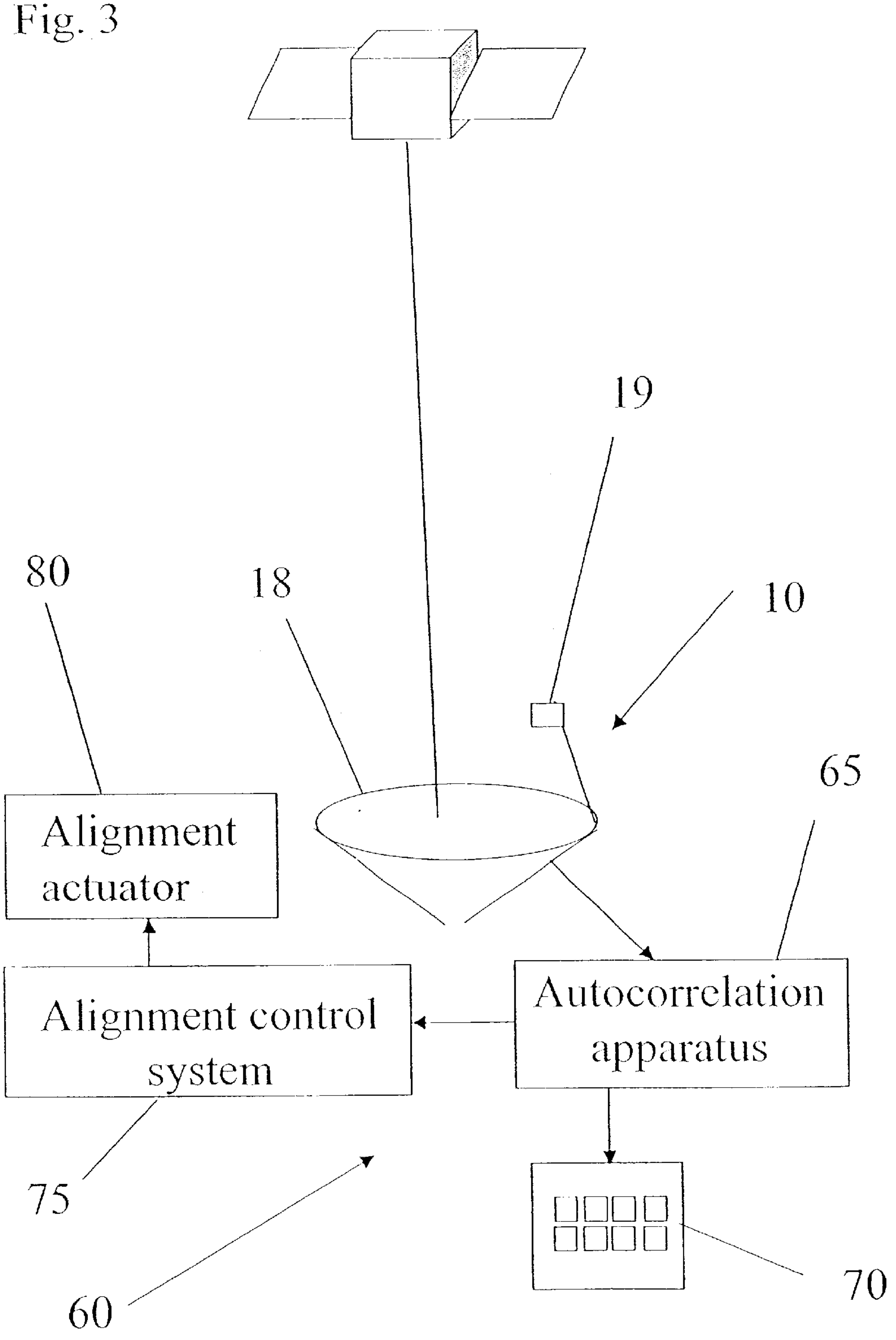
FIG. 3 is a schematic view of an alignment equipment setup for use with the end-user terminal of FIG. 1.

Reference is now made to FIG. 3, which is a schematic view of an alignment equipment setup 60 for use with end-user terminal 10. Alignment equipment setup 60 includes an autocorrelation apparatus 65 that autocorrelates output 40 and output 50. Autocorrelation apparatus 65 is explained in more detail with reference to FIG. 4. Alignment equipment setup 60 also includes a display device, typically being a digital voltmeter (DVM) 70, for displaying the measurement of autocorrelation calculated by autocorrelation apparatus 65. Polarization axes 25, 30 are adjusted, typically manually, to minimize the reading of voltmeter 70. It should be noted the measurement of autocorrelation could be processed to enable display by other methods and these methods might not include the use of a digital voltmeter to display the result. Alternatively, the output of autocorrelation apparatus 65 is directly connected to an alignment control system 75. Alignment control system 75 is configured to operate an alignment actuator 80. Alignment actuator 80 adjusts polarization axes 25, 30. Alignment actuator 80 is typically a system of fluid operated or motorized actuators that adjust at least one of reflector 18 and antenna feed 19. Alignment control system 75 is explained in more detail with reference to FIG. 6.

Figure 4:
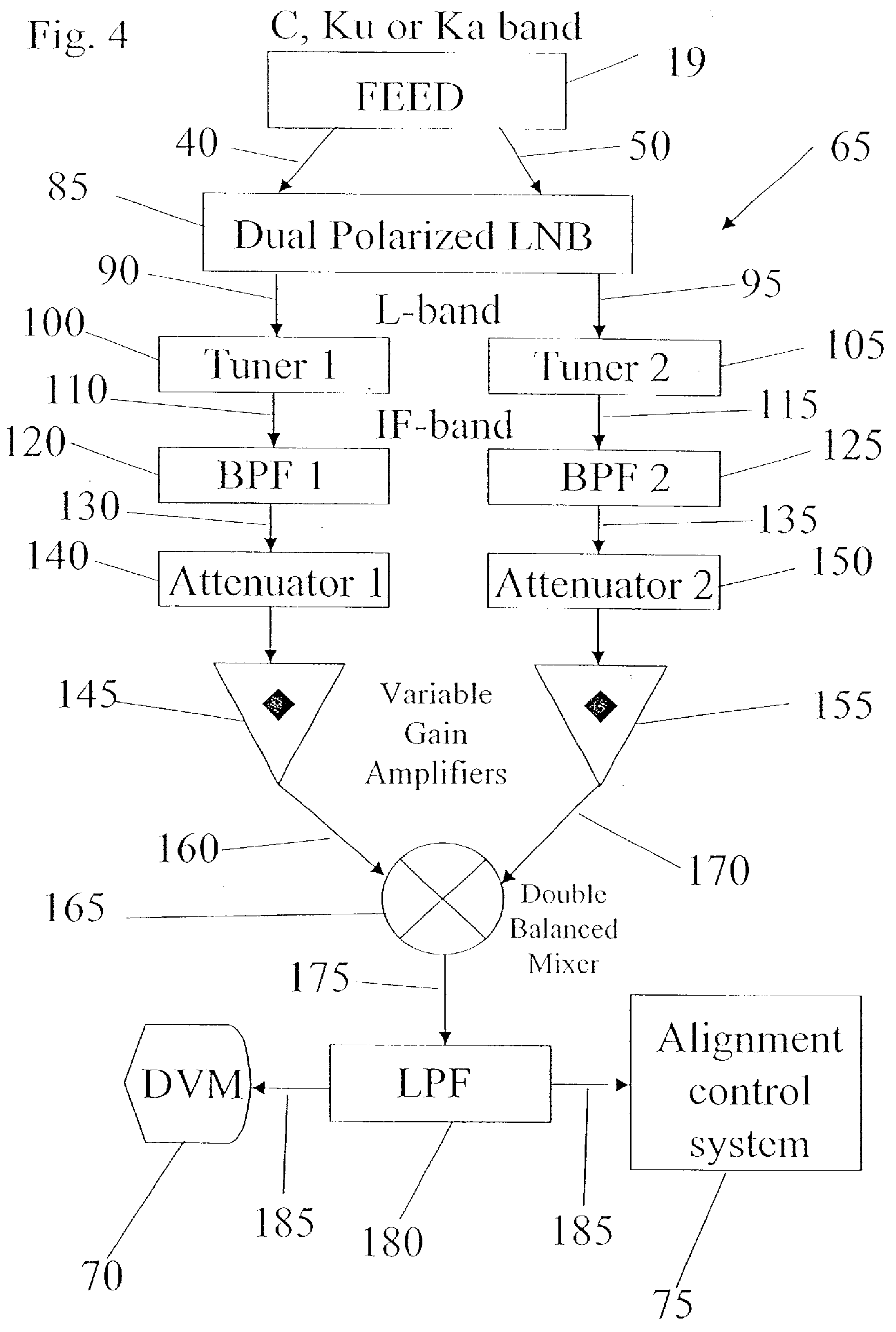
FIG. 4 is a schematic representation of the operation of an autocorrelation apparatus for use with the end-user terminal of FIG. 1.

Reference is now made to FIG. 4, which is a schematic representation of the operation of autocorrelation apparatus 65. Autocorrelation apparatus 65 includes a dual polarized low noise block down-converter (LNB) 85. Block down-converter 85 typically forms part of end-user terminal 10 and is located close to antenna feed (FEED) 19. Output 40 and output 50 are inputs of block down-converter 85. Block down-converter 85 reduces proportionately all frequencies contained within output 40 and output 50 from Ku-band or C-band to L-band. Block-down converter 85 produces an output 90 corresponding to down-converted output 40 and an output 95 corresponding to a down-converted output 50. One output terminal of block down-converter 85 is connected to the input terminal of a tuner 100 and the other output terminal of block down-converter 85 is connected to the input terminal of a tuner 105. Output 90 is input to tuner 100 and output 95 is input to tuner 105. Tuner 100 tunes output 90 to the down-converted frequency of signal 15. Tuner 105 tunes output 95 to the down-converted frequency of signal 15. Tuner 100 and tuner 105 also down-converts the frequencies contained within output 90 and output 95 from L-band to IF-band. Tuner 100 produces an output 110. Tuner 105 produces an output 115. The output terminal of tuner 100 is connected to the input terminal of a band-pass filter (BPF) 120. The output terminal of tuner 105 is connected to the input terminal of a band-pass filter 125. Band-pass filters 120, 125 typically have a pass band that is in the range of 6 MHz to 8 MHz wide. Band-pass filters 120, 125 reject unwanted noise received by antenna 17 at the edges of the frequency band of signal 15. Band-pass filter 120 produces an output 130. Band-pass filter 125 produces an output 135. The output terminal of band-pass filter 120 is connected to the input terminal of a variable attenuator 140. The output terminal of variable attenuator 140 is connected to the input terminal of a variable gain amplifier 145. The output terminal of band-pass filter 125 is connected to the input terminal of a variable attenuator 150. The output terminal of variable attenuator 150 is connected to the input terminal of a variable gain amplifier 155. Output 130 is amplified by variable gain amplifier 145 and adjusted in level by variable attenuator 140 to produce an output 160. Output 160 has a signal level in the range of 0 dBm to 15 dBm to comply with the working range of a double balanced mixer 165 in the next stage of autocorrelation apparatus 65. Output 135 is amplified by variable gain amplifier 155 and adjusted in level by variable attenuator 150 to produce an output 170. Output 170 has a signal level in the range of 0 dBm to 15 dBm to comply with the working range of double balanced mixer 165 in the next stage of autocorrelation apparatus 65. Double balanced mixers are commercially available, for example, from Mini Circuits, Brooklyn, N.Y. The output terminal of variable gain amplifier 145 is connected to a first input terminal of double balanced mixer 165. The output terminal of variable gain amplifier 155 is connected to a second input terminal of double balanced mixer 165. Double balanced mixer 165 produces an output 175 that contains a low frequency component and a high frequency component. The low frequency component of output 175 is proportional to the multiplication of correlating terms of output 160 and output 170. The high frequency component of output 175 is proportional to non-correlating terms of output 160 and 170 and to the multiplication of correlating terms of output 160 and output 170. The output terminal of double balanced mixer 165 is connected to the input terminal of a low-pass filter (LPF) 180. Low-pass filter 180 is typically in the range 1 Hz to 10 Hz. Low-pass filter 180 produces an output 185 that contains the low frequency component of output 175. Output 185 is therefore the measurement of autocorrelation of output 40 and output 50.

It should be noted that substitute components are typically available for use in autocorrelation apparatus 65 to provide the same functionality as the components mentioned above. Moreover, the components of autocorrelation apparatus 65 may be assembled in a different order and some may be omitted entirely. For example if a higher frequency mixer is available it is possible to remove some or all of the down-converters. In addition, the amplifiers and attenuators may not be needed.

The output terminal of low-pass filter 180 is connected to the input terminal of digital voltmeter 70 for displaying the measurement of autocorrelation calculated by autocorrelation apparatus 65. Alternatively, the output terminal of low-pass filter 180 is connected to the input terminal of alignment control system 75.

Reference is now made to FIG. 5, which is a table comparing the system of FIG. 4 to a signal strength system of polarization alignment. Following is an algebraic treatment comparing the autocorrelation method using autocorrelation apparatus 65 of FIG. 4 to the traditional signal-strength system of polarization alignment. It should be noted that the following algebraic treatment is presented to facilitate a more complete understanding of the system of FIG. 4 and is not in any way limiting the scope of the invention as defined by the claims appended hereto.

At optimal alignment of the antenna polarization axes 25, 30 towards satellite 20 the level of output 185 is zero. At a small error rotation angle Δθ from optimum polarization alignment the signal to noise ratio of output 185 relative to a maximum signal to noise ratio of output 185 obtained with an offset angle of 45° is given by:

$$[S/N]_{(DC)}(\Delta\theta)/[S/N]_{(DC)}(45^\circ)=\mathrm{Cos}^2(\Delta\theta)\times\mathrm{Sin}^2(\Delta\theta)\approx(\Delta\theta)^2 \quad \text{(equation 1)},$$

where $[S/N]_{(DC)}(\Delta\theta)$ is the signal to noise ratio of output 185 due to an error rotation angle of Δθ and $[S/N]_{(DC)}(45^\circ)$ is the signal to noise ratio of output 185 due to an error rotation angle of 45°) and ≈ means approximately equal to.

At the output of band-pass filter 120 the following equation is valid:

$$[S/N]_{(IF\ Co-Po1)}(45^\circ)=[S/N](0^\circ)_{(IF\ Co-Po1)}-3\ dB_{(45^\circ)} \quad \text{(equation 2)},$$

where $[S/N]_{(IF\ Co-Po1)}(45^\circ)$ is the signal to noise ratio of output 130 information bandwidth at offset rotation angle of 45°, $[S/N](0^\circ)_{(IF\ Co-Po1)}$ is the signal to noise ratio of output 130 information bandwidth at offset rotation angle of 0° and 3 $dB_{(45^\circ)}$ denotes a reduction in the signal to noise ratio by 3 dB due to a rotation angle of 45°.

The following equation is also valid:

$$[S/N]_{(DC)}(45^\circ)=[S/N]_{(IF\ Co-Po1)}(0^\circ)\times[DW/DW1]\times[DW/DW2]-Y\ [dB] \quad \text{(equation 3)},$$

where DW is the signal bandwidth of output 130, DW1 is the bandwidth of band-pass filter 120 and DW2 is the bandwidth of low-pass filter 180 and Y[dB] is expressed as 3 $dB_{(45\ Rotation)}$+3 $dB_{(Mixer)}$=6 dB (equation 4), where 3 $dB_{(Mixer)}$ is the reduction in the signal to noise ratio by 3 dB due to an insertion loss of mixer 165.

Substituting equation 4 into equation 3 gives:

$$[S/N]_{(DC)}(45^\circ)=[S/N]_{(IF\ Co-Po1)}(0^\circ)\times[DW/DW1]\times[DW/DW2]-6\ dB \quad \text{(equation 5)}.$$

The following algebraic relationship is valid:

$$[DW/DW1]\times[DW/DW2]=[DW/DW1]\times[DW/DW2]\times[DW1/DW1] \quad \text{(equation 6)}.$$

Equation 6 can be rearranged to give:

$$[DW/DW1]\times[DW/DW2]=[DW/DW1]\times\times[DW1/DW2] \quad \text{(equation 7)}.$$

As mentioned above with relation to FIG. 4, the bandwidth of band-pass filter 120 is typically in the range 6 MHz to 8 MHz therefore:

$$DW1=6\ MHz=68\ dB\text{-}Hz \quad \text{(equation 8)}.$$

Now, assuming a worst case of DW/DW1=0.1=−10 dB, then:

$$[DW/DW1]^2\times[DW1/DW2]=-20\ dB+68\ dB=48\ dB \quad \text{(equation 9)}.$$

Now, assuming a worst case of $[S/N]_{(IF\ Co-Po1)}(0^\circ)$=10 dB and substituting equation 9 into equation 5, gives:

$$[S/N]_{(DC)}(45^\circ)=10\ dB+48\ dB-6\ dB=52\ dB \quad \text{(equation 10)}.$$

Equation 1 is rearranged giving:

$$[S/N]_{(DC)}(\Delta\theta)\approx(\Delta\theta)\times[S/N]_{(DC)}(45^\circ) \quad \text{(equation 11)}.$$

Therefore, by substituting equation 11 into equation 10, assuming a worse case scenario the signal to noise ratio of output 185 due to an error rotation angle of Δθ is given by:

$$[S/N]_{(DC)}(\Delta\theta)\approx(\Delta\theta)^2+52\ dB \quad \text{(equation 12)}.$$

As the practical threshold level for error detection in the polarization alignment is a signal to noise ratio of 1 to 1, which is 0 dB, then for the traditional polarization alignment method, based on received satellite signal strength alone, the relative change above threshold due to a small offset rotation angle of Δθ is given by approximately:

$$\mathrm{Cos}^2(\Delta\theta) \quad \text{(equation 13)}.$$

Therefore, it can be seen that the autocorrelation method results in more than 40 dB increase in the signal to noise ratio as compared to the traditional signal-strength pointing method. The results are shown in the table of FIG. 5. The second column of the table represents the results of the autocorrelation method based on equation 12 and the third column of the table represents the results of the traditional signal-strength pointing method based on equation 13.

Figure 6:
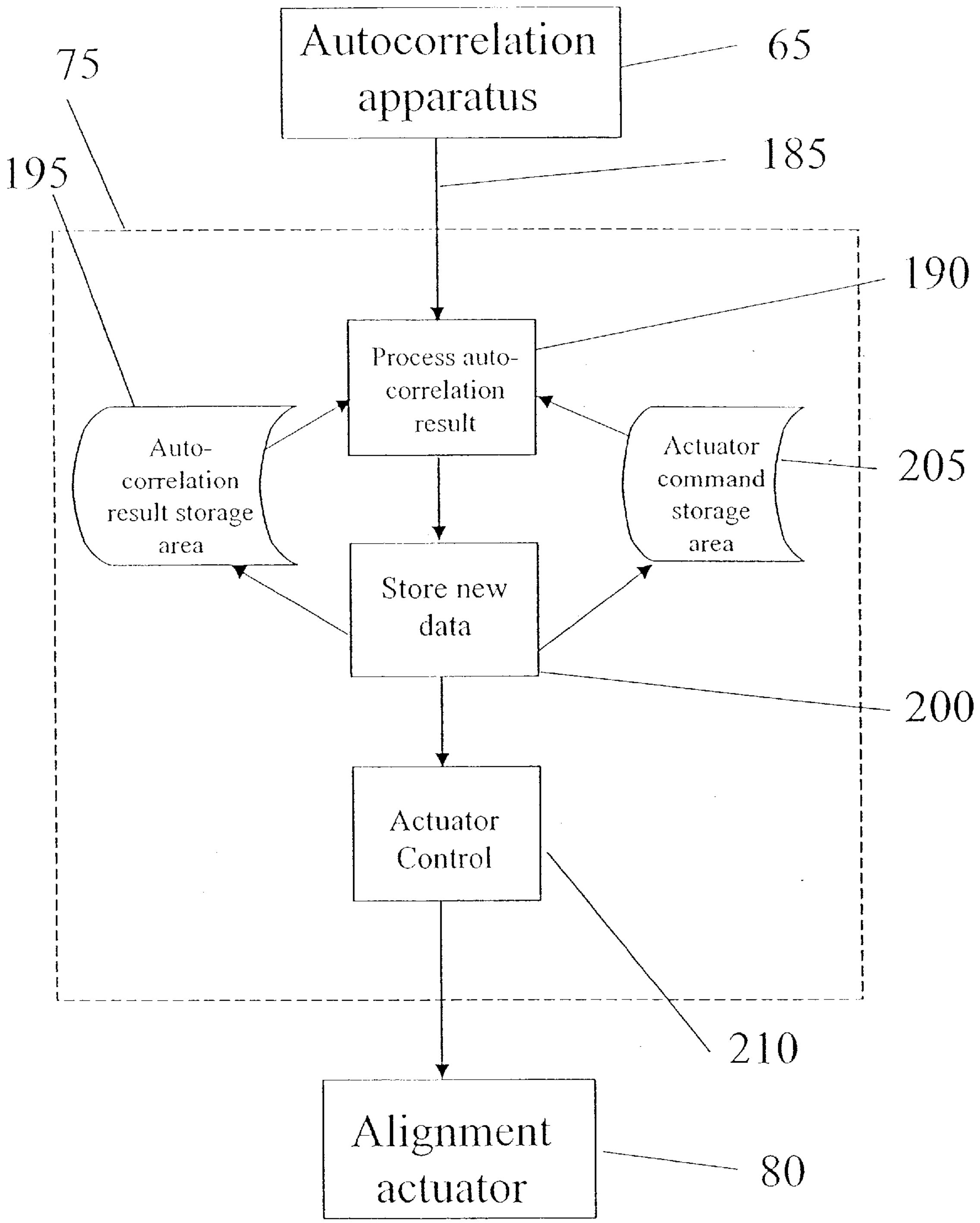
FIG. 6 is a schematic representation of the operation of an alignment control system for use with the autocorrelation apparatus of FIG. 4.

Reference is now made to FIG. 6, which is a schematic representation of the operation of alignment control system 75 for use with the autocorrelation apparatus 65. In block 190, output 185 being the result of autocorrelation is processed. This process includes checking an autocorrelation result storage area 195 for a prior stored result of autocorrelation. If there is no prior stored result of autocorrelation, the processor decides on an initial estimated adjustment command for alignment actuator 80. The process continues with block 200. In block 200, new data is stored. Newly received result of autocorrelation is stored in autocorrelation result storage area 195. The initial adjustment command for alignment actuator 80 is stored in an actuator command storage area 205. In block 210, an actuator controller sends the initial adjustment command to alignment actuator 80. Alignment actuator 80 adjusts polarization axes 25, 30.

After the initial adjustment has been made a new result of autocorrelation is received. The process continues at block 190. In block 190, autocorrelation result storage area 195 is checked for a prior stored result of autocorrelation. The prior stored result is retrieved and compared to the newly received result of autocorrelation. If the new result is less than the prior result, alignment actuator 80 will be instructed to continue adjusting in the same direction. If the new result is greater than the prior result, alignment actuator 80 will be instructed to adjust in an opposing direction. The prior actuator command is retrieved from actuator command storage area 205. A new actuator adjustment command is calculated. The process continues with block 200. In block 200, new data is stored. The newly received result of autocorrelation is stored in autocorrelation result storage area 195. The new adjustment command is stored in an actuator command storage area 205. In block 210, actuator controller sends the new adjustment command to alignment actuator 80. Alignment actuator 80 adjusts polarization axes 25, 30. This process continues repeatedly at block 190 until output 185 being the result of autocorrelation approaches zero.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

What is claimed is:

1. A method for aligning antenna polarization axes of a dual polarized end-user terminal having an antenna, the antenna being aligned with a satellite in relation to azimuth and elevation, the end-user terminal being configured to produce a first output corresponding to a first component of a received signal parallel to a first polarization axis of the antenna and a second output corresponding to a second component of the received signal parallel to a second polarization axis of the antenna, the first polarization axis being orthogonal to the second polarization axis, the method comprising the steps of:

(a) receiving a linearly polarized signal having a frequency wherein for said frequency and during a time period when said signal is being transmitted, the satellite is not transmitting signals with a linear polarization that is orthogonal to said linearly polarized signal;

(b) autocorrelating the first output and the second output to produce a measurement of autocorrelation; and (c) adjusting the antenna polarization, axes to minimize said measurement of autocorrelation.

2. The method of claim 1 wherein said step of autocorrelating is performed by inputting said first output and said second output into an electronic mixer to produce said measurement of autocorrelation.

3. The method of claim 2 further comprising the step of reducing proportionately frequencies of said first output and said second output.

4. The method of claim 2 further comprising the step of tuning said first output and said second output to said frequency.

5. The method of claim 2 further comprising the step of filtering said first output using a first band pass filter and said second output using a second band pass filter.

6. The method of claim 1 wherein said step of autocorrelating is performed by inputting said first output and said second output into an electronic mixer and inputting the output of said electronic mixer into a low-pass filter to produce said measurement of autocorrelation.

7. The method of claim 1 further comprising, after said step of autocorrelating, the step of displaying said measurement of autocorrelation.

8. The method of claim 1 wherein said step of adjusting is performed by actuating an alignment actuator configured to adjust the antenna polarization axes to minimize said measurement of autocorrelation.

9. A system for aligning antenna polarization axes of a dual polarized end-user terminal having an antenna, the antenna being aligned with a satellite in relation to azimuth and elevation, the end-user terminal being configured to produce a first output corresponding to a first component of a received signal parallel to a first polarization axis of the antenna and a second output corresponding to a second component of the received signal parallel to a second polarization axis of the antenna, the first polarization axis being orthogonal to the second polarization axis, the system comprising:

(a) a first connection configured for connection to the end-user terminal for receiving the first output;

(b) a second connection configured for connection to the end-user terminal for receiving the second output; and (c) an autocorrelation apparatus having a first input and a second input; wherein said first connection is connected to said first input and said second connection is connected to said second input.

10. The system of claim 9 wherein said autocorrelation apparatus includes an electronic mixer having a first input that is connected to said first connection and a second input that is connected to said second connection.

11. The system of claim 10 wherein:

(a) said autocorrelation apparatus further includes a low-pass filter having an input; and (b) said electronic mixer has an output that is connected to said input of said low-pass filter.

12. The system of claim 11 further comprising a display having an input and wherein:

(a) said low-pass filter has an output; and (b) said input of said display is connected to said output of said low-pass filter.

13. The system of claim 10 wherein:

(a) said autocorrelation apparatus further includes a dual polarized block down-converter having a first input that is connected to said first connection and a second input that is connected to said second connection; and (b) said dual polarized block down-converter is interposed between said first connection, said second connection and said electronic mixer.

14. The system of claim 10 wherein said autocorrelation apparatus further includes:

(a) a first down-converter that is interposed between said first connection and said electronic mixer; and (b) a second down-converter that is interposed between said second connection and said electronic mixer.

15. The system of claim 10 wherein said autocorrelation apparatus includes:

(a) a first tuner that is interposed between said first connection and said electronic mixer; and (b) a second tuner that is interposed between said second connection and said electronic mixer.

16. The system of claim 10 wherein said autocorrelation apparatus includes:

(a) a first band pass that is interposed between said first connection and said electronic mixer; and (b) a second band pass filter that is interposed between said second connection and said electronic mixer.

17. The system of claim 9 further comprising an alignment control system and an alignment actuator wherein said alignment control system is configured to control said alignment actuator to adjust the antenna polarization axes in response to an output of said autocorrelation apparatus.

18. A system for aligning antenna polarization axes comprising:

(a) a dual polarized end-user terminal having an antenna and said antenna having an associated first polarization axis and a second polarization axis, wherein:

(i) said first polarization axis is orthogonal to said second polarization axis; and (ii) said end-user terminal is configured to produce a first output corresponding to a first component of a received signal parallel to said first polarization axis and a second output corresponding to a second component of the received signal parallel to a second polarization axis;

(b) a first connection configured for connection to said end-user terminal for receiving said first output;

(c) a second connection configured for connection to said end-user terminal for receiving said second output; and (d) an autocorrelation apparatus having a first input and a second input; wherein said first connection is connected to said first input and said second connection is connected to said second input.

19. The system of claim 18 wherein said autocorrelation apparatus includes an electronic mixer having a first input that is connected to said first connection and a second input that is connected to said second connection.

20. The system of claim 19 wherein:

(a) said autocorrelation apparatus further includes a low-pass filter having an input; and (b) said electronic mixer has an output that is connected to said input of said low-pass filter.

21. The system of claim 20 further comprising a display having an input and wherein:

(a) said low-pass filter has an output; and (b) said input of said display is connected to said output of said low-pass filter.

22. The system of claim 18 further comprising an alignment control system and an alignment actuator wherein said alignment control system is configured to control said alignment actuator to adjust the antenna polarization axes in response to an output of said autocorrelation apparatus.

* * * * *